Feb. 12, 1952  C. A. BICKEL ET AL  2,585,215
POWER UNIT

Filed March 24, 1945  10 Sheets-Sheet 1

INVENTORS
CLIFFORD A. BICKEL
STANLEY A. BRANDENBURG
BY THEODORE FOSTER

Toulmin & Toulmin
ATTORNEYS

Feb. 12, 1952  C. A. BICKEL ET AL  2,585,215
POWER UNIT
Filed March 24, 1945  10 Sheets-Sheet 2
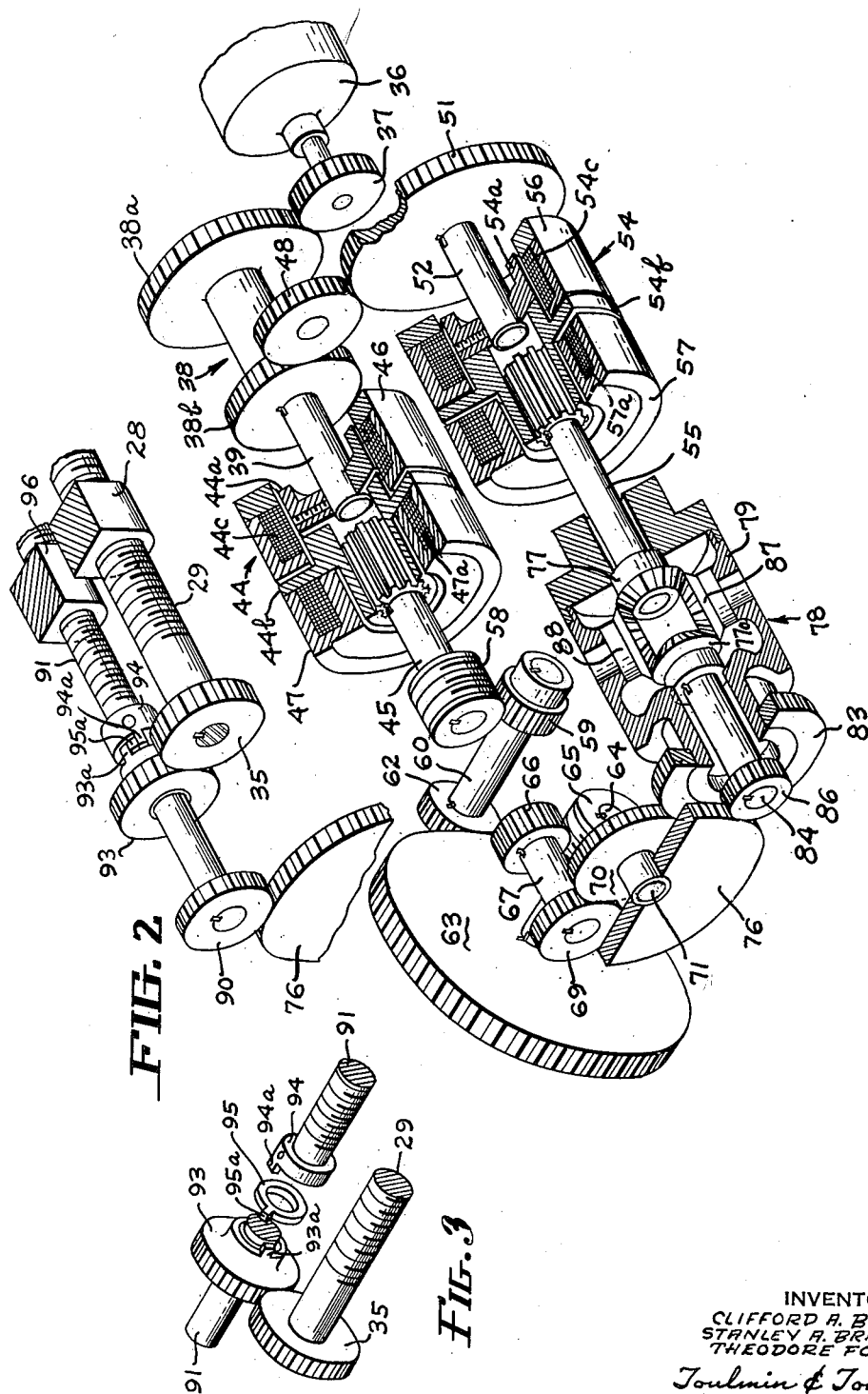
INVENTORS
CLIFFORD A. BICKEL
STANLEY A. BRANDENBURG
THEODORE FOSTER
Toulmin & Toulmin
ATTORNEYS

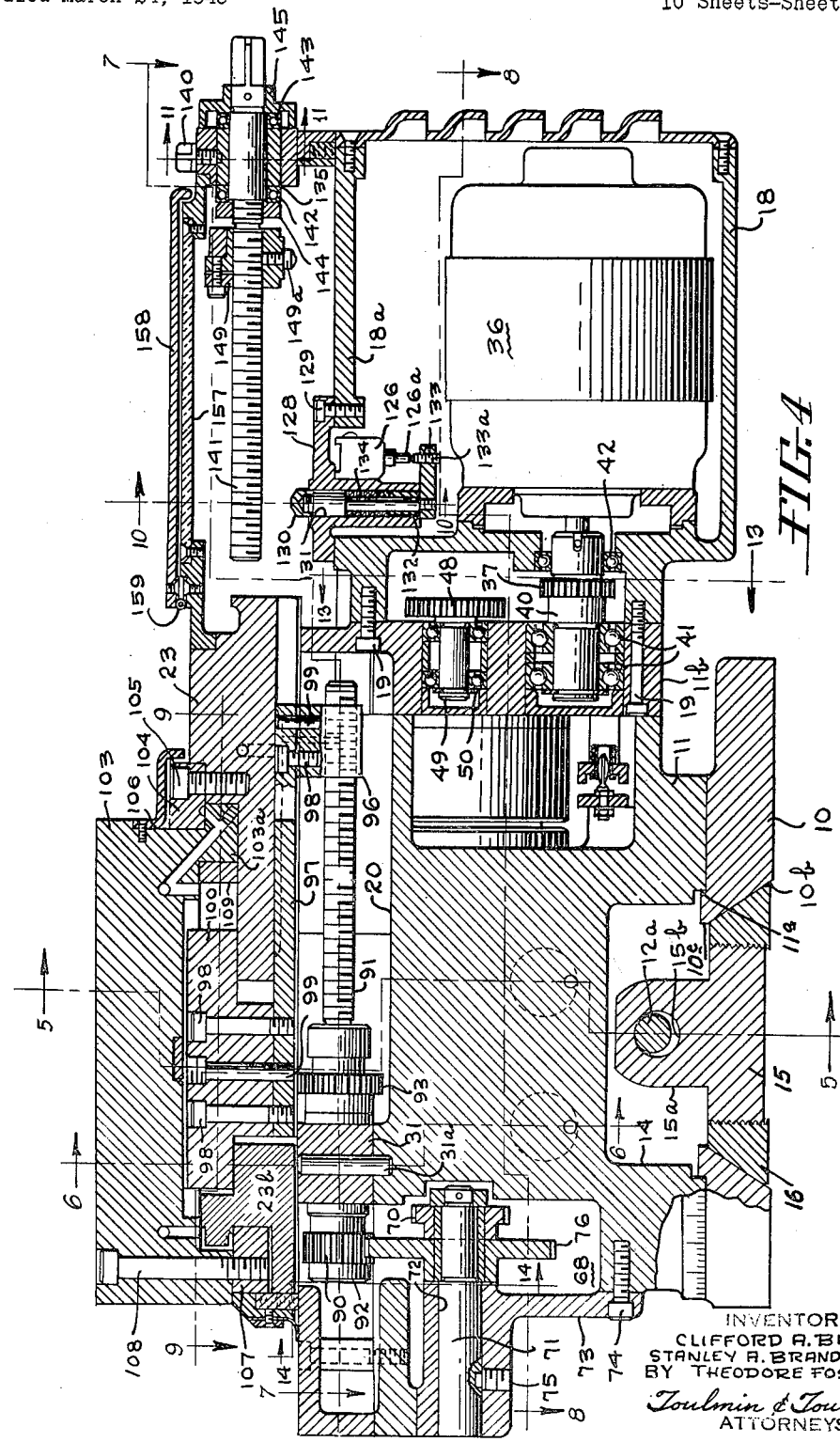

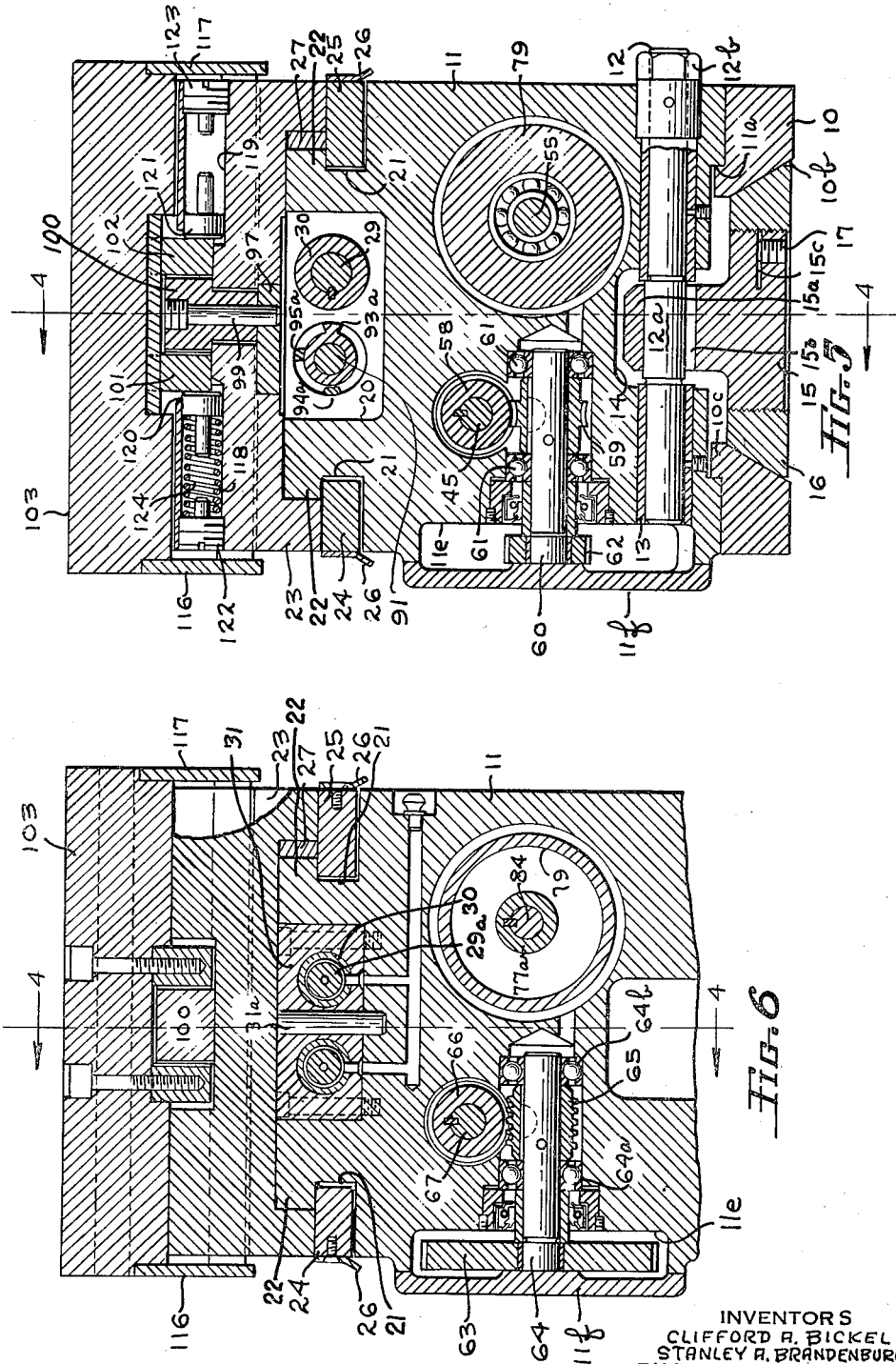

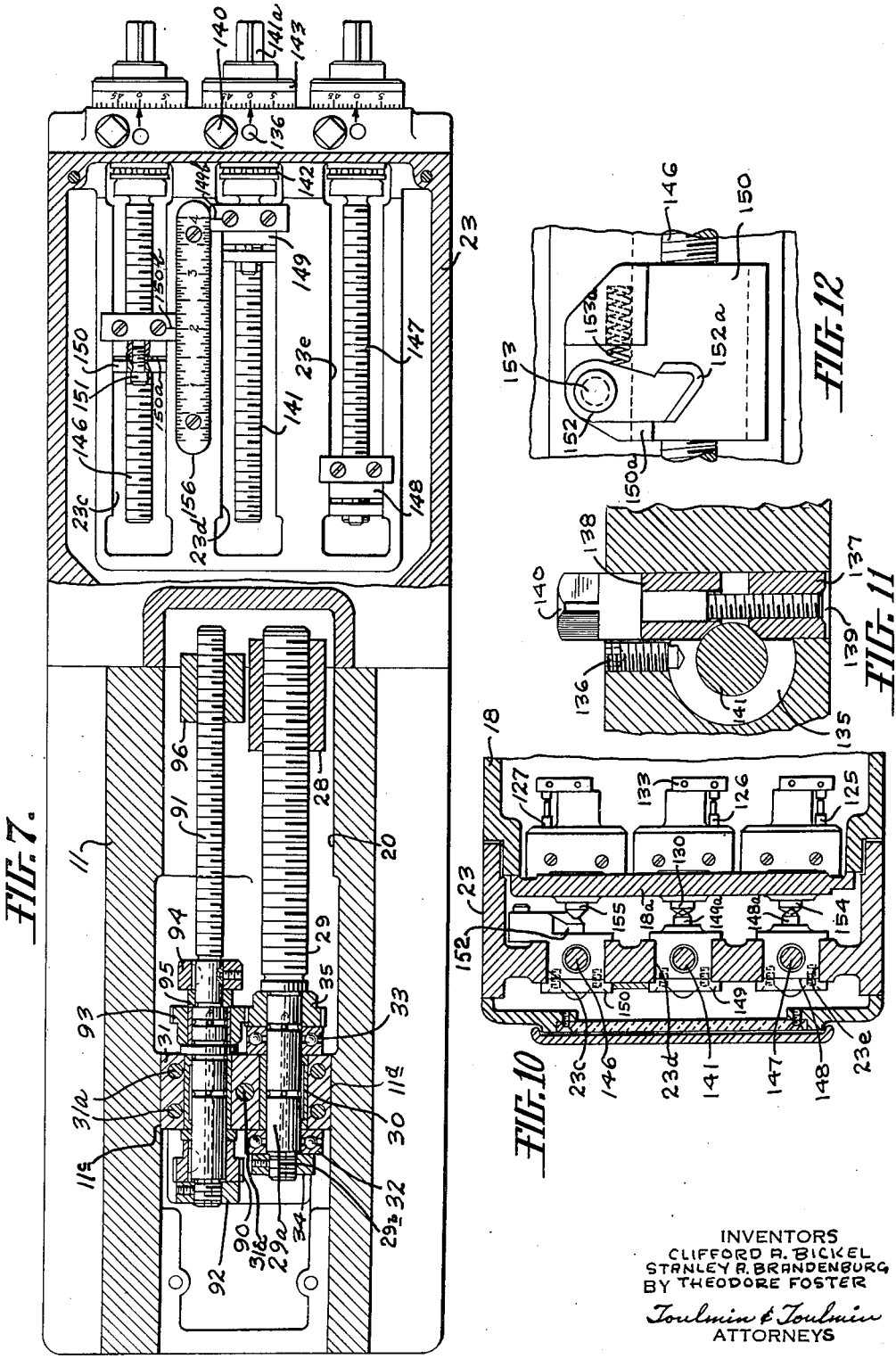

Feb. 12, 1952 — C. A. BICKEL ET AL — 2,585,215
POWER UNIT
Filed March 24, 1945 — 10 Sheets-Sheet 6

FIG. 8.

INVENTORS
CLIFFORD A. BICKEL
STANLEY A. BRANDENBURG
BY THEODORE FOSTER
Toulmin & Toulmin
ATTORNEYS

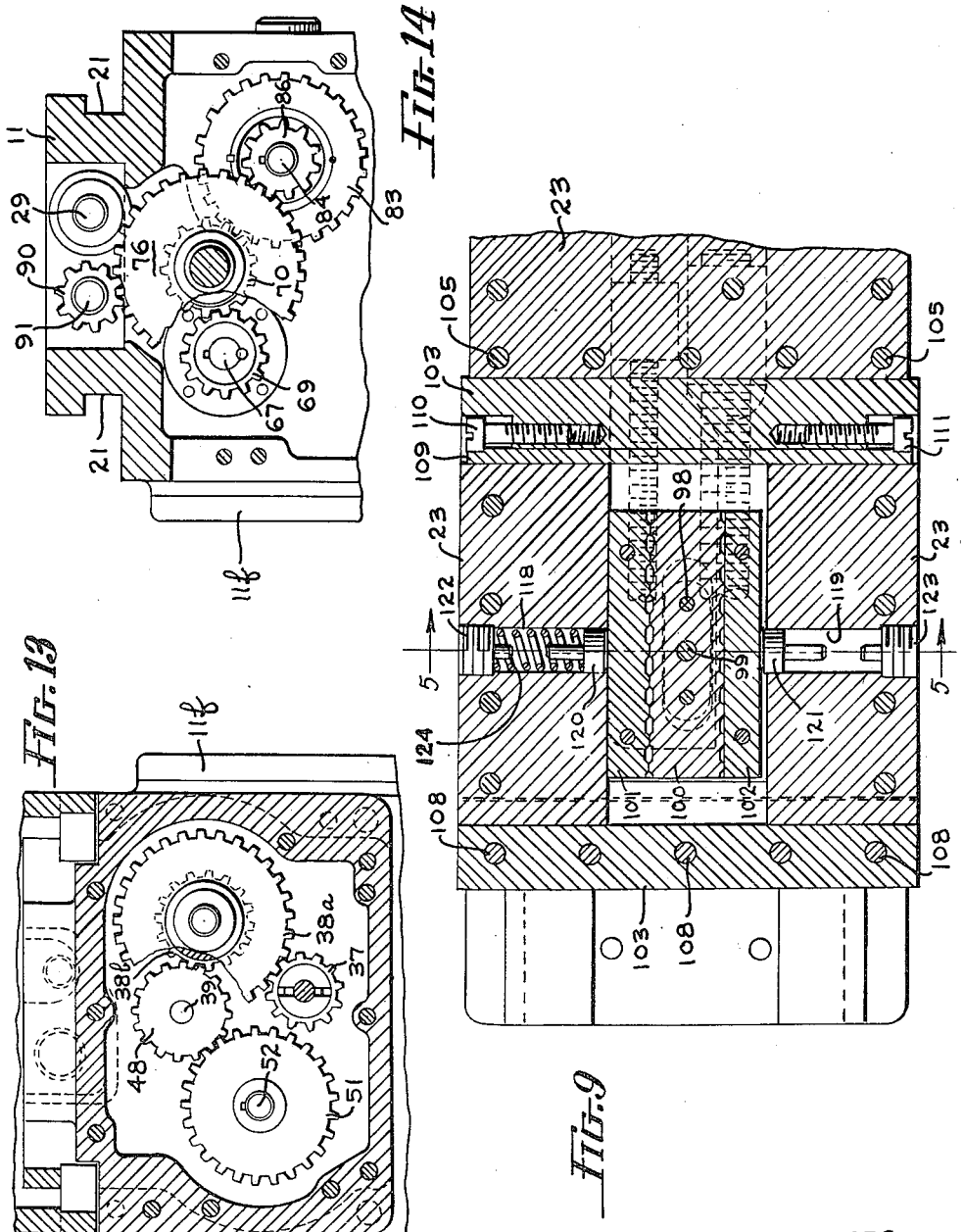

Feb. 12, 1952          C. A. BICKEL ET AL          2,585,215
                          POWER UNIT
Filed March 24, 1945                          10 Sheets-Sheet 8
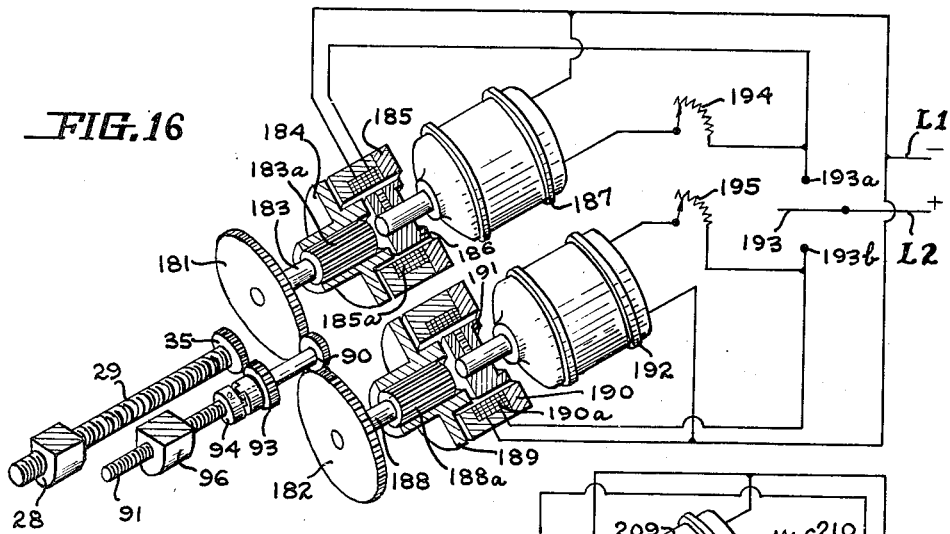
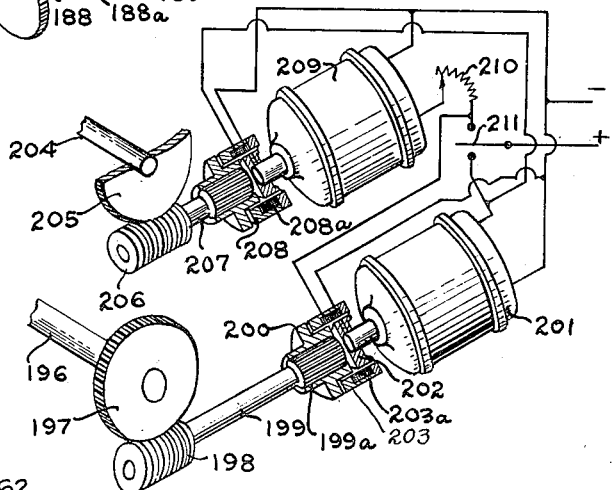
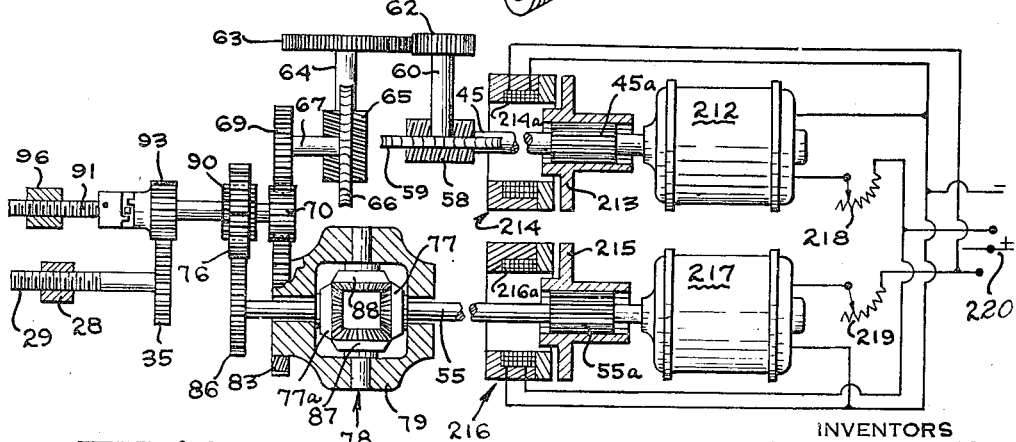
INVENTORS
CLIFFORD A. BICKEL
STANLEY A. BRANDENBURG
BY THEODORE FOSTER
Toulmin & Toulmin
ATTORNEY Feb. 12, 1952 C. A. BICKEL ET AL 2,585,215
POWER UNIT
Filed March 24, 1945 10 Sheets-Sheet 9

INVENTORS
CLIFFORD A. BICKEL
STANLEY A. BRANDENBURG
BY THEODORE FOSTER
Toulmin & Toulmin
ATTORNEY

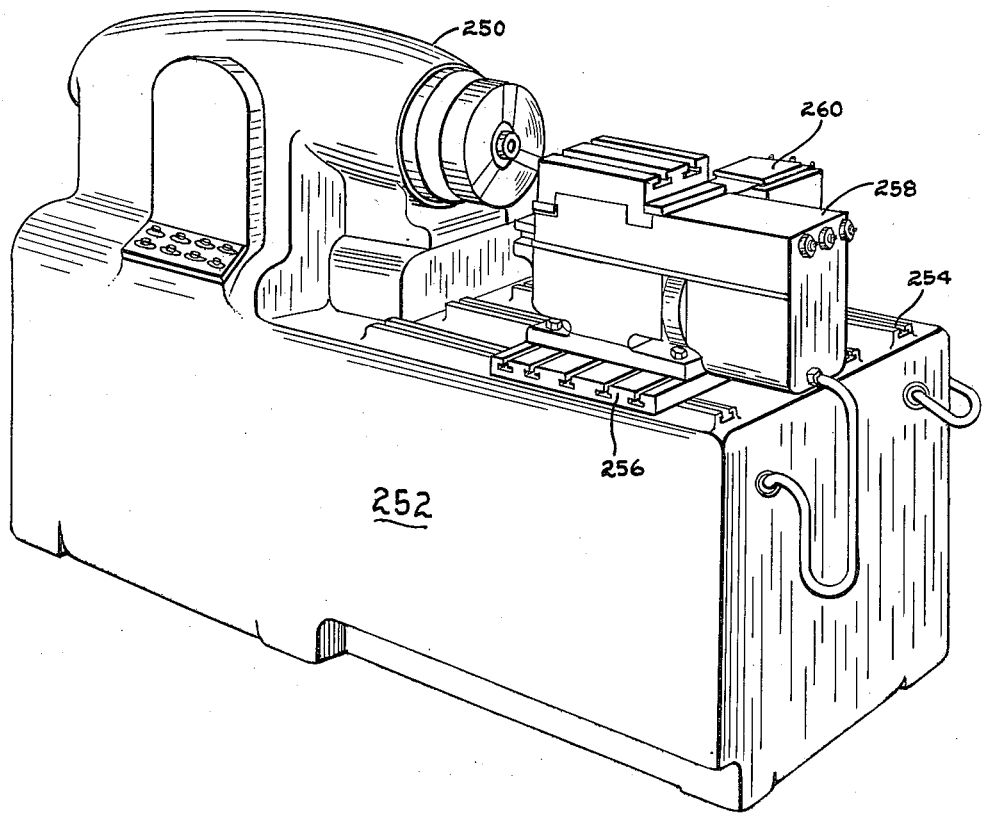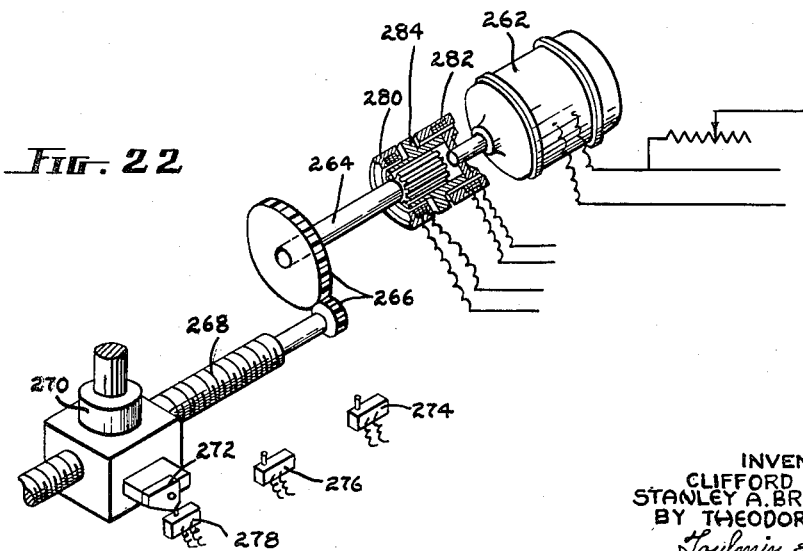

Patented Feb. 12, 1952

2,585,215

UNITED STATES PATENT OFFICE 2,585,215

POWER UNIT

Clifford A. Bickel, Stanley A. Brandenburg, and Theodore Foster, Sidney, Ohio, assignors to The Monarch Machine Tool Co., Sidney, Ohio, a corporation of Ohio Application March 24, 1945, Serial No. 584,570

23 Claims. (Cl. 82—2)

This invention relates to power units particularly intended for use in connection with various types of machine tools. In such tools it is often desired to reciprocate a tool or machine part to and from a working position by a power drive. Also, it is often advantageous and saving in time to start a reciprocation at a relatively high speed, continue the rapid rate of movement until just prior to engagement between the tool, or other metal-working part and the work piece, and thereafter to continue the work-operating portion of the reciprocation at a reduced speed determined by the character or nature of the tool and the material of which the work piece is composed. At the end of the work stroke, it is often desirable to effect a limited relative movement separating the tool and the work prior to initiation of the return portion of the cycle.

In lathes and other machine tools the movement of the tool is ordinarily accomplished by lead screws, feed rods, or gear trains driven from the principal source of power of the machine. This involves long gear trains and interlocking controls, expensive to build and assemble and often difficult to control automatically.

Accordingly, it is a principal object to provide a unit that has a wide range of usefulness and operating characteristics in connection with various types of machine tools and that effects the functions mentioned, in a rapid and efficient manner.

It is another object to provide a self-contained unit that is adapted to be mounted on the bed or carriage of a lathe or on the column of a drill or other vertical machine tool and that carries its own source of power.

Another object is to provide a machine tool attachment unit as aforesaid embodying an improved motor, clutch and brake control device that provides an extremely wide and flexible range of adjustments whereby the reciprocating slide may have a variable range or stroke and may be advanced rapidly to any point thereof, slowed down to work operating speed, and rapidly retracted for a full stroke at the end of the work-operating stroke.

A still further object is to provide a unit as previously mentioned, wherein the tool or other work-operating part is retracted or relieved from contact with the work at the termination of a working stroke and held in retracted position during a rapid return traverse of the tool.

A further object is to provide a device having alternative drives between the power source and slide one of which may operate at a selectively variable speed, together with adjustable means automatically operated by movement of the slide itself to shift from one of said drives to the other.

Another object is to provide a device as in the immediately preceding paragraph, wherein the point in the travel of the tool at which shifting is effected may be precisely varied and adjusted in a facile manner.

A still further object is to provide a unit as aforesaid, wherein the means for manually adjusting the stroke and speed change are mounted as a unit in an easily observable position and are precisely adjustable with the aid of scales giving an extremely fine reading.

Another object is to provide a self-contained unit that may be shifted from one base to another as required and one that may be used with like units on a single bed in various arrangements and capable of a wide range of applications such as drilling (single or multiple spindle), reaming, milling, hollow milling, boring, counterboring and spotfacing, with automatic or remote control.

Other objects and advantages will become apparent as the description proceeds.

In the drawings:

Figure 2 is a diagrammatic view showing the two power drives between the driving motor and the lead screw.

Figure 3 is an expanded perspective view of a portion of Figure 2.

Figure 4 is a section taken along the line 4—4 of Figures 5, 6 and 8, looking in the direction of the arrows and showing the rotatable mounting for the table, the driving motor, the lead screw and one adjustable switch-operating means.

Figure 5 is a sectional view taken along the line 5—5 of Figures 4 and 9, showing the rotatable mounting for the table, the main slide and the means for imparting tool relief movement to the cross slide.

Figure 6 is a section taken along the line 6—6 of Figures 4 and 8, and showing the table, the main and cross slides, and a portion of the lead screw driving mechanism.

Figure 7 is a section, taken along the line 7—7 of Figure 4, and showing particularly the two lead screws and the adjustable switch-actuating control screws.

Figure 8 is a sectional view taken substantially along the line 8—8 of Figure 4, showing the table, the motor compartment, the electro-magnetic clutches, and portions of the alternate drives to the lead screw.

Figure 9 is a sectional view taken along the line 9—9 of Figure 4, looking in the direction of the arrows, and showing in detail the tool relief slide, the controlling cam therefor, and the mechanism for actuating the slide.

Figure 10 is a section taken along the line 10—10 of Figure 4, looking in the direction of the arrows and showing the motor, clutch and brake control switches as well as the adjustable switch-actuating elements therefor.

Figure 11 is a section taken along the line 11—11 of Figure 4 and showing one of the clamps.

Figure 12 is a detail view of the nut and switch-actuating means carried by one of the screws.

Figure 13 is a section taken along the line 13—13 of Figures 4 and 8 and showing the arrangement of gears from the driving motor shaft to the two electro-magnetic clutches.

Figure 14 is a section taken along the line 14—14 of Figure 4 and showing the arrangement of gears connecting the differential to the lead screw.

Figure 16 is a perspective view, partly in section, showing a form of our invention in which two driving motors are employed with alternative clutches connecting each motor to the drive to the lead and relief screws.

Figure 17 is a plan view, partly in section, showing a modified form of the invention using separate motors for speed variation each motor being connected to the lead and relief screws through clutches and irreversible drives.

Figure 18 is a view of another modified form of the invention using separate driving motors driving the lead and relief screws through clutches and reducing gears.

Figure 21 is a perspective view of our invention applied to a lathe and including a sub-bed adjustable on the bed of the lathe.

Figure 22 is a diagrammatic perspective view of a modified form of our invention wherein a variable speed motor drives a screw which carries a tool holder.

Figure 1:
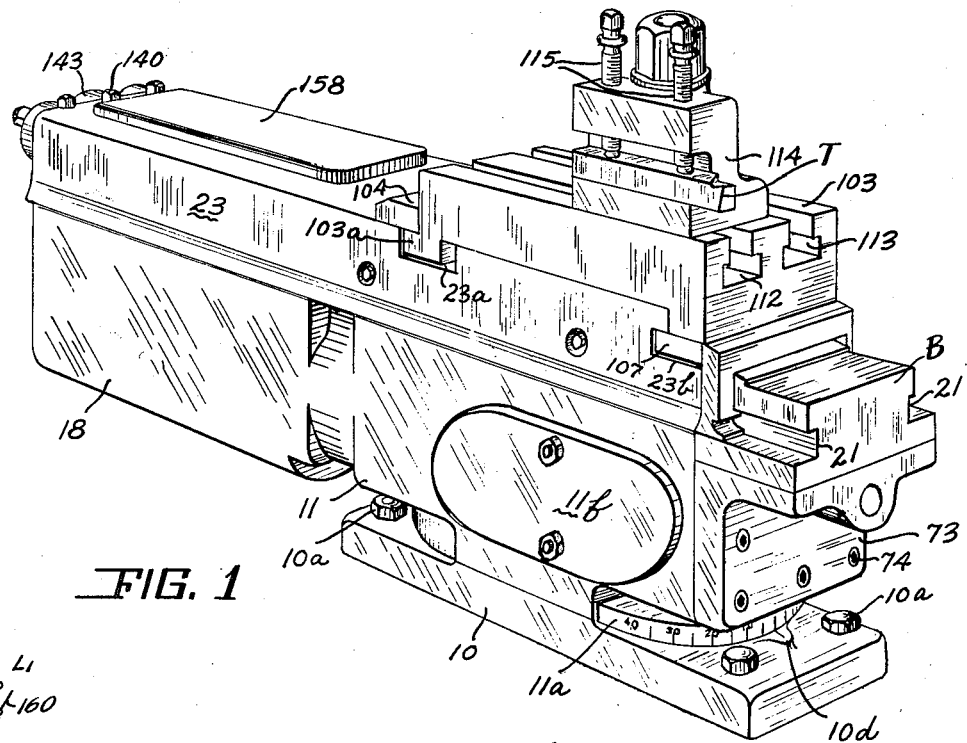
Figure 1 is a perspective view of our power unit showing particularly the base, table, main and cross slides.

Referring in detail to the drawings wherein like numerals refer to corresponding parts throughout, the unit of this invention includes a base 10, adapted to be connected, as by screws 10a, to the bed of a lathe, milling machine, or other machine tool. Base 10, is formed with an undercut, or frustoconical opening 10b, and a circular shoulder 10c, concentric of opening 10b. A bed or support 11, has a circular recess 11a on its underside rotatably fitting shoulder 10c. A shaft 12, Figure 4, having an intermediate, eccentric or cam portion 12a, is journaled in bushings 13 fitting in aligned apertures in bed 11. The axis of these apertures extends diametrically of and over opening 10b and intersects a recess 14 formed in bed 11. A gib comprising a core or threaded plug 15, has a frusto-conical ring 16 screw-threaded thereto fitting opening 10b. Plug 15 has an upstanding central lug 15a, apertured as at 15b to receive the eccentric portion 12a of shaft 12. The threaded portion of plug 15 is split as at 15c and a set screw 17 acts to spread the split portion and lock the parts 15 and 16 together. When adjustment is necessary such as might be caused by wear, screw 17 is loosened and ring 16 is rotated relatively to plug 15, to effect the desired adjustment, whereupon, screw 17 is again turned home.

By the foregoing construction, as a wrench is applied to head 12b and shaft 12 is thereby turned, eccentric portion 12a acts to draw ring 16 upwardly into binding engagement with the surface of opening 10b, whereby bed 11 is clamped to base 10 in an obvious manner. As shown upon Figure 1, the outer semi-circular wall 11a, of bed 11, has a scale of angular degrees formed thereon. This scale coacts with an indicator 10d fixed to base 10 whereby the angular relation between the bed 11 and base 10 may be determined.

As shown more particularly at Figures 1 and 4, the bed 11 has a motor housing 18 secured to one end thereof, as by screws 19; and as shown at Figures 5 and 6, the bed 11 is formed with a cored pocket 20 and opposed channels 21 forming ways 22 on and along which a slide 23 is guided as by rails 24 and 25 attached to slide 23 and projecting into channels 21. Shields 26 are secured to rails 24 and extend downwardly over the clearance between the bottom of rails 24 and 25 and the adjacent surface of bed 11 and act to prevent the entrance of dirt and chips within said clearance. A gib 27 is interposed between the parallel surfaces of the table and slide to maintain precise sliding relation of the parts in a manner well known in the art.

Slide 23 has a nut member 28 secured to the under side thereof and projects into pocket 20 where it threadedly engages a lead screw 29 that, as shown at Figure 7, has an end portion 29a journaled in a sleeve 30 fitting an aperture in a bracket 31 fitting between side wall portions 11c and 11d, and held in place by dowels 31a. Screw 29 is provided with thrust bearings 32 and 33 at opposite sides. A collar 34 engages the threaded end portion 29b and coacts with bearing 32 to limit axial movement in one direction, of screw 29 relatively to bracket 31. A pinion 35 is fixed to screw 29 and coacts with thrust bearing 33 to prevent axial movement of screw 29 in the opposite direction. Thus, as screw 29 is rotated by mechanism subsequently to be described, slide 23 is translated along the ways of bed 11.

The mechanism for rotating screw 29 may comprise a motor 36 that, as shown more clearly at Figure 2, is directly connected to a pinion 37 in mesh with one gear 38a of a compound gear 38 keyed to a shaft 39. Referring to Figure 4, it will be noted that pinion 37 is integral with a short shaft 40 journaled in anti-friction bearings 41 and 42 carried by an end wall 11b of bed 11 and the adjacent wall of motor housing 18, respectively. As illustrated at Figure 8, shaft 39 is journaled in wall 11b in anti-friction bearings 43 and has fixed to its end projecting within the chamber in bed 11, a core 44a of an electromagnetic clutch. The armature 44b of clutch 44 is shaped as clearly shown at Figures 2 and 8, to have a splined bore, fitting the correspondingly splined end of a shaft 45. The winding or coil 44c of clutch 44, is carried by a housing 46 fixed to wall 11b. Coil 44c therefore remains fixed at all times but, when energized, acts to draw armature 44b axially into clutching engagement with core 44a, whereby shaft 39 is connected to drive shaft 45.

An electro-magnetic brake comprises a housing 47 and a coil 47a therein both fixed within an opening in bed 11. Thus, when clutch coil 44c is de-energized, and coil 47a is energized, armature 44b is drawn into contact with housing 47 and shaft 45 is held against rotation.

Gear 38b meshes with an idler gear 48 that, as seen in Figure 4, is fixed on a stub shaft 49 journaled in anti-friction bearings 50 mounted within a recess in wall 11b. Gear 48, in turn, meshes with, and drives, a gear 51 keyed to a shaft 52 rotatably mounted in anti-friction bearings 53 carried by wall 11b (Figure 8). Shaft 52 has attached thereto a core 54a of an electro-magnetic clutch 54. As in the case of clutch 44, the clutch 54 has an armature 54b having a splined bore to receive the splined end of a shaft 55, and a coil 54c fixed with its housing 56, to the wall 11b. Upon energization of coil 54c, armature 54b is attracted and moved axially into contact with core 54a, to thereby connect shaft 55 to be driven by shaft 52. A magnetic brake housing 57 and its coil 57a, are fixed to bed 11, so, that, when energized, and with coil 54c de-energized, armature 54b and shaft 55 are fixed against rotation.

The alternate drives from shafts 45 and 55 to screw 29 will now be described. Shaft 45 carries a worm 58 in mesh with a worm gear 59 fixed to a shaft 60. Figure 5, it will be noted that shaft 60 is rotatably mounted within a recess in bed 11, by means of bearings 61 positioned upon opposite sides of gear 59. A change gear 62 is attached to the outer end of shaft 60 and meshes with a change gear 63, in turn fixed to a shaft 64 (Figures 2 and 6). It will be noted from Figures 1, 5 and 6, that these gears 62 and 63 lie within a cored pocket 11e in bed 11. This pocket has a removable cover 11f so that various sizes of gear pairs may be easily substituted to alter the speed ratio of the drive therethrough from motor 36 to screw 29. This shaft 64 is journaled in bearings 64a and 64b and carries a worm 65 in mesh with a gear 66 keyed to a shaft 67 that projects into a cored pocket 68 formed in the left end of bed 11, as viewed in Figure 4. Shaft 67 carries a pinion 69 in pocket 68, which pinion meshes with an idler gear 70 journaled upon a stub shaft 71. Shaft 71 fits within a bore 72 formed in a cover plate 73 that is secured to bed 11 by socket head screws 74. A set screw 75 acts to lock shaft 71 in position in bore 72. Shaft 71 also journals a second idler gear 76.

Shaft 55 has been previously described, and from Figure 2 it will be noted that the end of this shaft opposite the splined portion, carries a bevel pinion 77 forming one side of a differential generally designated as 78. The frame or planetary element 79 of differential 78 is shaped as shown in cross-section in Figure 8, and has sleeve portions supported by anti-friction bearings 80 and 81 fitting within a cylindrical recess 82 in bed 11. This frame has a sleeve or collar on which a gear 83 is keyed; and from Figure 2, it will be noted that gear 83 meshes with and is adapted to be driven by gear 70. The left end of frame 79 has a bore within which a shaft 84 is journaled, as by ball bearings 85. Shafts 55 and 84 are, of course, co-axial. A pinion 86 is fixed to the end of shaft 84 within pocket 68 and, from Figure 2, it will be seen that this pinion meshes with, and drives gear 76, previously mentioned. Frame 79 carries the usual planetary pinions 87 and 88, journaled upon a shaft 89 extending diametrically across frame 79 and fixed thereto.

For the sake of clarity, gear 76 is shown upon Figure 2 broken in halves; and it will be noted that the upper half is shown in mesh with a pinion 90 keyed to a screw 91 and locked in position by a nut 92, Figure 7. Screw 91 is journaled within a bearing in bracket 31 upon an axis parallel to that of screw 29. A pinion 93 is journaled upon a plain portion of screw 91 adjacent bracket 31. This pinion carries an axially projecting lug 93a of Figures 2 and 3, extending into the path of a lug 94a carried by a sleeve 94 fixed to screw 91. A ring 95 is journaled on screw 91 between pinion 93 and collar 94 and has a lug 95a lying in the paths of lugs 93a and 94a. Screw 91 threadedly engages a nut 96, Figure 4. This nut is fixed to an auxiliary slide 97 by means of a screw 98' and a dowel 99'.

As shown at Figures 4 and 5, slide 97 is guided between ways formed in slide 23 and extends axially along screw 91 to a point substantially over gear 93 where it is attached, as by means of screws 98 and a dowel 99 to a cam 100. From Figure 9 it will be noted that this cam is generally rectangular in shape and has, along opposed parallel sides thereof, a series of wedges or teeth adapted to slide between and engage, corresponding teeth formed on guide strips or followers 101 and 102. These strips are fixed to a tool relief slide 103 which, as will be presently described is mounted on main slide 23 for movement at right angles to the direction of movement of slide 23.

From Figure 4 it will be noted that a guide rail 104 is secured to slide 23 by means of screws 105 to overhang a guide channel 23a therein extending transversely of slide 23 and within which fits a correspondingly shouldered edge 103a of relief slide 103. A guard strip 106 is attached to slide 103 and extends downwardly over rail 104 to prevent the entrance of chips and dirt between the relatively slidable surfaces. At the opposite side, slide 103 has a guide rail 107 secured thereto by screws 108. This rail slidably engages a correspondingly-shaped channel 23b formed in main slide 23, whereby relief slide 103 is mounted upon main slide 23 for movement transversely of the direction of movement of the latter. A gib 109 is interposed between the adjacent guide surfaces of slides 23 and 103 and, as seen in Figure 9, is adjustable by means of screws 110 and 111 that take into threaded apertures in slide 103 and have their heads engaging arcuate recesses in the gib. By this construction, smooth accurate sliding engagement of slide 103 in the ways in slide 23, is at all times assured. As shown at Figure 1, slide 103 has T-slots 112 and 113 for attaching various types of tool holders thereto. One type is shown at 114 and carries a cutting tool T, fixed to the holder by screws 115. Slide 103 is also provided with protective strips 116 and 117, Figures 5 and 6, that extend downwardly and protect the relatively slidable surfaces between slides 23 and 103 against the entrance of dirt and chips.

Referring to Figures 5 and 9, it will be noted that slide 23 has opposed aligned bores 118 and 119, extending in the direction of movement of slide 103, and so positioned that plungers 120 and 121 slidably fitting the respective bores, may contact guide strips 101 and 102. Both bores have their outward ends closed by plugs 122 and 123 threaded into counterbored end portions of each bore. As shown, a coil spring 124 is interposed between plunger 120 and plug 122 whereby slide 103 is urged to the right with regard to Figure 5, relatively to slide 23. When the parts 100 and 101 are in the position shown at Figure 9, the thrust of spring 124 has no effect, but when cam 100 is slid axially as by rotation of screw 91, so that the teeth thereof come opposite depressions in the correspondingly toothed edge of strip 101, spring 124 acts to move slide 103 transversely a distance equal to the depth of the teeth, to thereby provide relief for the cutting edge of a tool mounted thereon.

Motor 36 may be a conventional three phase reversible machine and by the mechanical drive previously described and whose operation will be subsequently described, rotation of said motor in opposite directions moves slide 23 over its ways in corresponding opposite directions.

Figure 15:
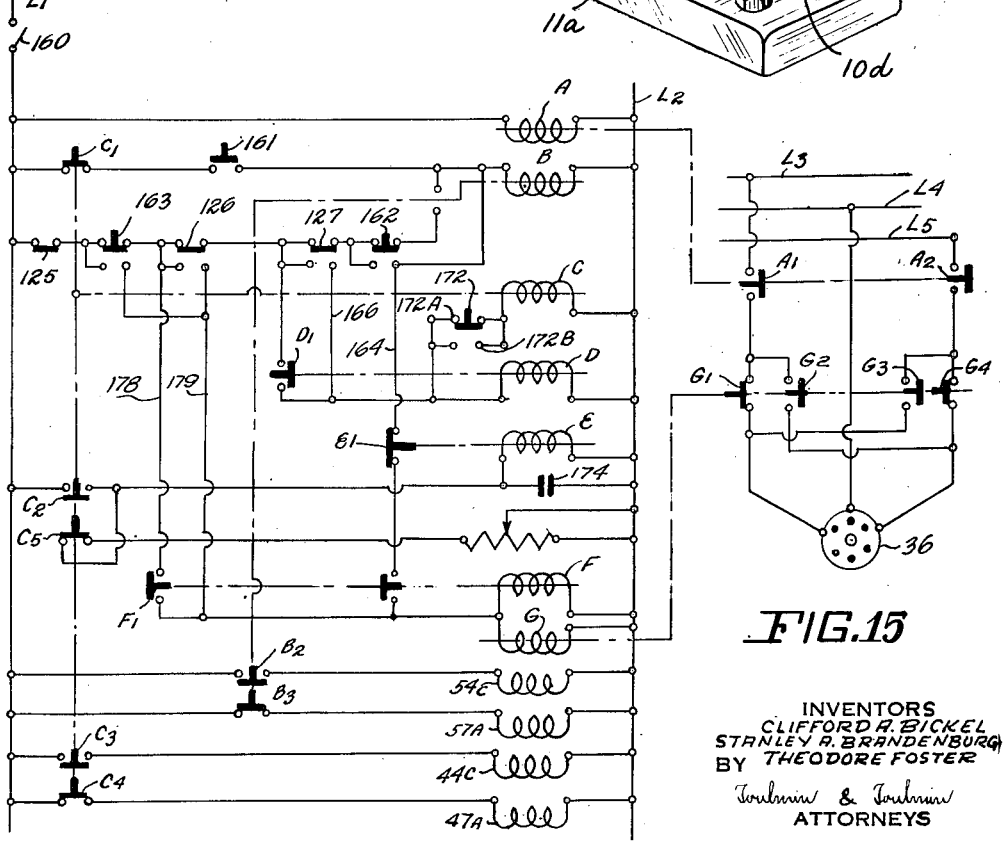
Figure 15 is a wiring diagram showing the control circuits for the motor, clutches and brakes.

Means are provided for automatically reversing motor 36 at any desired points in the travel of slide 23 over bed 11 and also for so controlling coils of clutches 44 and 54 and brakes 47 and 57, as to change the rate of drive of slide 23 at desired points in its travel. These means take the form of switches preferably secured in the upper wall 18a, of motor housing 18. Three switches 125, 126 and 127, Figure 15, are shown but it will be understood that more or fewer switches may be used, depending upon the number of functions or changes that it is desired to perform.

Referring to Figure 4, switch 126 and the actuating parts therefor, include a frame 128 secured over an opening in motor housing wall 18a by a screw 129. This frame has a bore 131 in which a plunger 130 slidably fits and has its replaceable tip projecting slightly above the outer surface of frame 128. The lower end of bore 131 is closed by a collar 132. Plunger 130 has its lower end projecting through this collar and attached to a switch arm 133 which, at its outer end has a screw 133a adapted to contact the plunger 126a of micro-switch 126. Switch 126 in turn is carried by frame 128. A coil spring 134 is positioned within bore 131 and acts between collar 132 and a shoulder on plunger 130, to urge the latter upwardly and thus hold screw 133a in contact at all times with plunger 126a. It will be noted that the entire switch unit is carried by frame 128 and may be removed and replaced merely by the removal and replacement of screw 129. As all switch units employed are identical, it is not necessary to describe the others.

As will be apparent from Figures 1, 4, 7 and 10, slide 23 extends rearwardly over the motor housing 18 and in its end wall carries a plurality of spaced bushings one of which, 135, is shown at Figures 4 and 11. Bushing 135 is held in place by a set screw 136 and is cut away at its central portion to accommodate clamps 137, 138 fitting a bore 139 in slide 23 and adapted to be drawn together by a clamp screw 140 to thereby pinch a screw shaft 141 and lock it in adjusted rotated position. Anti-friction thrust bearings 142 surround shaft 141 at opposite ends of bushing 135 and, in cooperation with collars 144 and 145 fixed to shaft 141, act to prevent axial movement of said shaft while permitting easy rotation by means of a wrench applied to the squared outer end of shaft 141 when screw 140 is loosened. As seen at Figure 7, collar 143 has a scale engraved on its cylindrical surface. The graduations of this scale coact with an indicator fixed on the adjacent portion of slide 23 whereby extremely accurate adjustments of the screw and switch-actuating element carried thereby, are facilitated.

Figures 7 and 10 show that slide 23 is formed to provide three guide slots 23c, 23d and 23e all parallel to each other and symmetrically positioned at opposite sides of a respective screw shaft 146, 141 and 147. It will be understood that shafts 146 and 147 are rotatably mounted and having clamping and adjusting means identical with those just described in connection with screw 141 and which it is therefore unnecessary to describe in detail. Nuts 148, 149 and 150 are threaded upon the shafts 147, 141, and 146, respectively, and are so shaped as to slidably engage the side walls of the slots 23c, 23d and 23e, and to be restricted to translation along said slots. As shown more particularly at Figure 7, in connection with nut 150, each nut is transversely slotted, as at 150a, and the two sides are connected and adapted to be drawn together by a screw 151 whereby any looseness of a nut upon its screw may be eliminated.

Nuts 148 and 149 are identical and each carries a cam 148a and 149a, movable in the path of the switch-actuating plungers 130 and 154 and adapted to actuate each switch at a predetermined position of translation of slide 23, as will be understood from inspection of Figure 3. Nut 150 is shown in detail at Figure 12 and comprises a pawl 152 mounted upon a pivot pin 153 and urged in a clockwise direction of rotation against an abutment 150a, by a spring 153a. Pawl 152 is provided with a nose 152a positioned to be moved in a path intersecting plunger 155. Thus when nut 150 is moved in one direction nose 152a rides up and over the end of plunger 155, the pawl merely pivoting about pin 153 and compressing spring 153a. When nut 150 is moved in the other direction, pawl 152 is held in the position shown, Figure 12, by shoulder 150a, and thus acts to depress plunger 155 and actuate switch 127. The function of these switches will be subsequently explained. A scale 156, is secured between slots 23c and 23d and cooperates with indices 149b and 150b to determine the coarse adjustments of the respective nuts. Fine and final adjustments are, of course, determined by the scale on collar 143 and the corresponding collar fixed to shaft 146. A pane 157 of transparent material covers an opening in slide 23 over shafts 141, 146 and 147 and is protected by a cover plate 158 hinged to said slide at 159. Thus when it is desired to change the settings of the nuts 148, 149 or 150, it is merely necessary to raise cover 158, loosen the clamp screws such as 140, and turn the screw shafts to effect the desired adjustments while observing the parts through pane 157.

In Figure 15 is shown the electrical circuit controlling the actuation of the clutches, brakes and driving motor 36. This motor is preferably a three phase machine but may be of any other type adapted to be reversed by means of circuit closers. The direct current supply lines are shown at L1 and L2. A is the coil of a contactor connected to be energized upon closing of the switch 160 to thereby close the normally open blades A1 and A2, and start rotation of motor 36 in a predetermined direction.

Contactor coil B is connected to be energized by closure of a switch 161 through the normally closed contactor blades C1. Coil B, when energized, closes normally open blades B1 and B2, and opens blades B3. Blades C1 and switch 161 are by-passed by a line including the normally open blades B1, switch 162, the normally closed contacts of a single pole double throw limit switch 127, normally closed contacts of single pole double throw limit switch 126, the normally closed contacts of single pole double throw limit switch 163, and the normally closed contacts of limit switch 125, to thus establish a holding circuit for coil B. The switch 161 and the normally closed blades C1 are further by-passed by a line 164 that includes the normally closed blades E1, the normally open blades F2 and F1, line 178, switch 163, and limit switch 125.

Contactor coils C and D are connected across the main lines L1 and L2 by a line that includes normally open blades D1 of the contactor coil D, the normally closed contacts of switch 126, the normally closed contacts of switch 163, and the switch 125. A jogging switch 172 is also connected in series with the coil of contactor C and has normally closed contacts 172a and normally open contacts 172b. Contactor coil C, when energized, closes blades C2 and C3, and opens blades C1, C4 and C5. Contactor coil D, when energized, closes blades D1.

Contactor coil E controlling normally closed blades E1, is connected across lines L1 and L2 through the normally open blades C2, previously mentioned. A condenser 174 is connected in parallel with contactor coil E. An adjustable resistor 176, in series with blades C5, is shunted across the terminals of condenser 174. This condenser arrangement is for the purpose of delaying the energization of contactor coil E for a predetermined time after closure of blades C2, for a purpose that will be subsequently described.

Contactor coils F and G are connected in parallel across lines L1 and L2 and are adapted to be energized through normally open blades F1, switch 163 and limit switch 125. Coil B may be shunted by coils F and G through blades F2 and E1 under conditions subsequently described.

Coil 54c of clutch 54 is adapted to be energized by closure of the normally open blades B2 of coil B while coil 57a of brake 57 is connected across the lines by way of blades B3. The coil 44c of clutch 44 and coil 47a of brake 47 are connected across the lines through blades C3 and C4, respectively. Contactor coil G is for the purpose of reversing the direction of rotation of motor 36 and, for this purpose, controls normally closed blades G1 and G4, and normally open blades G2 and G3, Figure 15. As shown in said figure, when coil G is energized, the several blades G1 to G4, inclusive, act to reverse the phase relation and direction of rotation of the motor 36 in a manner well known in the art.

*Circuit operation*

In operation, upon manual closure of switch 160, contactor coil A is energized to thereby close blades A1 and A2, Figure 15, and start rotation of motor 36. The operator next closes switch 161 to energize coil B. Energization of coil B establishes a holding circuit from line L1 through switches 125, 163, 126, 127, 162, now closed blades B1 and coil B to line L2. At the same time, blades B2 are closed to energize coil 54c of clutch 54 and to open blades B3 and de-energize coil 57a. This connects shafts 52 and 55, Figure 2, and establishes a high speed drive from the motor 36 to the main slide or carriage 23, in the manner previously described. At the same time, coil 44c of clutch 44 is de-energized while coil 47a of brake 47 remains energized.

Slide 23 now advances at a relatively rapid rate until pawl 152 engages plunger 155 and throws switch 127 to its position opposite to that shown at Figure 15, thus breaking the holding circuit to coil B and de-energizing the same. Thereupon, blades B2 open and B3 close to de-energize coil 54c and energize coil 57a, thus disconnecting shafts 52 and 55 and locking shaft 55. Switch blade 127, being now in its lowermost position, Figure 15, acts to complete a circuit to contactor coils C and D by way of line L1, switches 125, 163, 126, lower contacts of switch 127, line 166 and coil D to line L2. As switch 172 is closed, coil C is also energized, as will be obvious from inspection of Figure 15. Energization of coil D closes blades D1 and establishes a holding circuit for coils C and D. Energization of coil C opens the blades C1 and C4 and closes blades C2 and C3. Closing of blades C3 acts to energize coil 44c of clutch 44, and to de-energize coil 47a of brake 47, thereby freeing shaft 45 and connecting it to be driven by shaft 39. The drive from motor 36 to slide 23 is now by way of the change gears 62 and 63 and the movement of slide 23 continues in the same direction but takes place at a reduced speed. Opening of blades C1 makes certain that inadvertent closure of switch 161 will have no effect upon coil B at this time. Operation upon the work piece now takes place until cam 149a, Figure 3, engages plunger 130 and shifts the blade of switch 126 from the position shown at Figure 14 to a position in which it closes its lower contacts, thereby de-energizing coils C and D. De-energization of coil C opens blades C2 and C3 while closing blades C1, C4 and C5. Coil 44c is now de-energized and coil 47a energized, to lock shaft 45 and stop further driving of the tool by way of this shaft.

Actuation of limit switch 126 also completes a circuit to coils F and G, by way of line L1, switches 125, 163, lower contacts of switch 126, and lines 179 and 180 to coils F and G and line L2. Motor 36 is thus reversed by the ensuing opening of blades G1 and G4, Figure 15, and the closing of blades G2 and G3. As coil F is energized, blades F1 and F2 are closed. Blades F1 complete a holding circuit for the coils F and G by way of line L1, switch 125, switch 163, line 178, blades F1 and coils F and G to line L2. Blades F2 complete a holding circuit for the coil B. The closing of blades F2, however, is ineffective to energize the coil B until blades E1 have closed. The coil E remains energized for a predetermined time, while the energy stored therein is dissipated through condenser 174 and resistor 176. As the latter is adjustable, this time interval is correspondingly adjustable within close limits. Inasmuch as both brake coils are energized at this time, the slide 23 is locked in position and dwells for a predetermined length of time determined by the aforementioned time delay circuit.

At the end of the time delay interval, contactor coil E is de-energized and blades E1 close to thereby establish a circuit from line L2 to coil B line 164, blades E1, blades F2 and F1, line 178, switch 163, and switch 125 to line L1. Coil B is thereby energized and blades B2 are closed to energize coil 54c while blades B3 are opened to de-energize coil 57a. This connects the motor 36 to the slide 23 through the high speed drive and, since the motor is now reversed, the slide 23 is rapidly retracted. In view of the pivoted mounting of pawl 152, nose 152a passes around plunger 155 and leaves switch 127 unaffected upon the retraction stroke.

As the slide reaches the limit of its retraction stroke, cam 148a engages plunger 154 and opens switch 125, thus interrupting the holding circuit for coil B so that blades B2 open and blades B3 close. The actuation of switch 125 is also effective to interrupt the holding circuit of coils F and G. De-energization of coil G permits blades G1 and G4 to close while G2 and G3 are opened. This restores the original connections, reverses the motor and causes slide 23 to advance on a new work stroke.

By operation of push button 172 feeding movement of the tool into the work may be halted at any time or the slide may be inched by depressing the blade to momentarily connect terminals 172b. Switch 163 may be depressed at any time to return the slide 23 to its initial position, while switch 162 may be operated at will during rapid traverse of the slide toward or from the work to inch the same.

Mechanical operation

The mechanical operation of the machine will now be described. Assume that, for example, the attachment is to be used on a machine tool where it is desired to move cutting tool T in a series of work strokes over a surface to be cut, where said tool, at the beginning of a stroke, is advanced rapidly toward the work by movement of slide 23, and is slowed down to appropriate cutting speed just prior to engagement of the tool with the work. The cutting then proceeds through a desired distance whereupon, the movement of slide 23 is stopped, tool T is withdrawn from the work in a limited tool relief movement of slide 103 relatively to slide 23, and thereafter slide 23 is rapidly retracted to the other terminus of its stroke and then reversed to repeat the cutting cycle.

The operator first adjusts screw 147 so that its nut 148 will trip switch 125 to reverse motor 36 at the desired point in the retraction stroke of slide 23. He then adjusts screw 141 so that its nut 149 will trip switch 126 to reverse motor 36 at the desired point in the forward stroke of slide 23. Finally, he adjusts screw 146 so that its nut 150 will trip switch 127 at the desired point in the forward stroke just prior to engagement of the tool with the work. The tool and work are fixed in proper relation and switch 160 is thrown to start the motor as previously explained in connection with the wiring circuit. The coil 44c is at this time de-energized while the coil 47a is energized whereby shafts 39 and 45 are disconnected and shaft 45 is locked. Also coil 54c of clutch 54 is energized, as previously explained, to positively connect shafts 52 and 55, while coil 57a of brake 57 is de-energized. Therefore, at this time, the drive from motor 36 is by way of pinion 37, gears 38a and 38b, idler gear 48, gear 51, shafts 52 and 55 to pinion 77 of differential 78. As the gear 83 is at this time locked by reason of its connection with shaft 45, pinion 77 rotates planetary gears 87 and 88 to thereby drive pinion 77a. The drive then proceeds by way of shaft 84, pinion 86, gear 76 and pinion 90 to shaft 91. At the beginning of the working stroke the teeth of cam 100 are located in the spaces between the teeth on the guide strip or follower 101. However, the friction of slide 23 on its ways is sufficient to overcome the force of spring 118 so that, because of the lost motion connection between shaft 91 and pinion 93, a limited rotation is imparted to shaft 91 before shaft 29 is picked up by engagement of lugs 93a and 94a. This initial rotation of shaft 91 is just sufficient to cause matching of the truncated portions of the teeth, as shown in Figure 9, whereby the tool slide 103 is transversely moved to move its tool into cutting relation with the work. Thereafter, both screws 29 and 91 are rotated synchronously; and slide 23 together with all parts carried thereby are relatively rapidly advanced toward or along the work.

Just prior to engagement of the tool with the work, cam 152 of nut 150 engages and actuates switch 127. As previously described, operation of switch 127 acts to de-energize coil 54c to disconnect shafts 52 and 54, to energize coil 57a to lock shaft 55, to de-energize coil 47a to free shaft 45, and to energize coil 44c to couple shafts 39 and 45. The drive to slide 23 now proceeds at a reduced speed from motor 36 via pinion 37, gear 38a, shafts 39 and 45, gear 59, shaft 60, pinion 62, gear 63, shaft 64, worm 65, gear 66, shaft 67, pinion 69, and gear 70 to gear 83 of differential planetary 79. As pinion 77 is at this time locked by reason of the energization of brake 57, the drive proceeds by way of planetary gears 87 and 88, bevel pinion 77a, shaft 84 and gear 76 to shaft 91, as previously traced.

Cutting now takes place and continues with movement of slide 23 until cam 149a of nut 149 actuates switch 126 to thereby reverse motor 36, as previously explained. Simultaneously with reversal of motor 36 the magnetic clutches and brakes are so energized that the high speed drive by way of shafts 52 and 55 is effective. Initial operation of shaft 91 only, because of the lost motion connection, shifts cam 100 a distance sufficient to permit spring 118 to force the teeth of follower 101 into the spaces between the teeth of cam 100. The slide 103 is thereby given a limited motion relieving the cutting tool from the work. Thereafter collar 94 picks up gear 93 and shafts 29 and 91 are therafter rotated synchronously to rapidly retract the slide 23 and cutting tool until nut 148 actuates switch 125 to again reverse the motor and start a new cycle. By changing gear pair 62, 63 for gears of other reciprocal radii, the cutting speed of the tool may be varied. From Figure 9, it will be apparent that, by removing plugs 122 and 123, spring 118 may be transferred to bore 119. Then, by interchanging strips 101 and 102, tool relief motion may be had in the direction opposite to that shown at Figure 9.

By our invention we have provided an attachment capable of a wide variety of uses in connection with numerous types of machine tools and having a wide range of adjustments and speeds. The reciprocation is rapid at all times except when actual cutting is in progress, at which time cutting proceeds at the correct linear speed for the material and tool being used. At the end of a cutting stroke, the tool is positively retracted to remove its cutting edge from the work whereby, upon the high speed retraction stroke, dulling of the tool and marring or chasing of the finished portions of the work are avoided.

Figure 16 shows a modified form of the invention in which the main and relief slides are used, as in the preferred form of Figures 1 to 15, inclusive, and are driven by the screw shafts 29 and 91, respectively, through nut members 28 and 96. Shaft 91 has collar 94 fixed thereto and pinion 93 journaled thereon, in mesh with pinion 35 fixed to screw shaft 29. Pinion 93 and collar 94 are provided with lugs and an interposed ring 95 to provide the lost motion connection as in the preferred form of the invention. Shaft 91 has pinion 90 fixed thereon and this pinion is constantly in mesh with a pair of gears 181 and 182.

Gear 181 is fixed to a shaft 183 having a splined end section 183a on which is slidably mounted the clutch disc or armature 184 having a correspondingly splined bore. Disc 184 is moved axially by and upon energization of a coil 185a of an electro-magnet 185, fixedly mounted as in the case of electro-magnet 44. A core 186 is fixed to the shaft of motor 187 and is mounted within the coil 185a. Thus, when coil 185a is energized, armature 184 is moved axially on splined portion 183a into contact with core 186, to thereby couple motor 187 to shaft 183.

Similarly, gear 182 is fixed to a shaft 188 having a splined end portion 188a on which is slidably mounted the clutch disc or armature 189 having a correspondingly splined bore. Disc 189 is moved axially on portion 188a by and upon energization of a coil 190a of an electro-magnet 190, fixedly mounted. A core 191 is fixed to the shaft of motor 192 and is positioned within coil 190a so that, upon energization of coil 190a, armature 189 is moved axially into engagement with core 191 to thereby couple motor 192 to shaft 188.

The power for driving motors 187 and 192 may be supplied from D. C. lines L1 and L2 and, as shown, each motor and its corresponding clutch coil are connected in parallel so that they are simultaneously energized and de-energized. Line L2 has a single pole double throw switch therein adapted to alternatively energize either motor and its associated clutch coil. The circuit of motor 187 has a rheostat 194 in its circuit that may be adjusted to effect speed control, preferably by variation of the shunt-field current. Likewise the circuit of motor 192 has a rheostat 195 in its circuit adjustable to vary the speed thereof in the same manner as with motor 187.

In operation of this form of the invention, switch 193 may correspond to switch 127 of the species of Figures 1 to 15, and may be similarly actuated by and upon movement of slide 23. One motor such as 187, for example, may be adjusted to operate at the higher traverse speed desired, while the other one will then be adjusted to give the correct feeding speed of the tool or other work-operating part. Upon the start of a cutting cycle, the arm of switch 193 will contact terminal 193a and motor 187 and its clutch coil 185a will be energized to drive screws 29 and 91 at traverse speed and advance slide 23 relatively rapidly. Upon actuation of switch 193, as described in connection with switch 127 in the preferred form of the invention, contact is made at 193b whereby motor 187 and its clutch coil 185a are deenergized and motor 192 and its clutch coil 190a, are energized. As a result of the opening of the circuit to coil 185a the momentum of the rotating parts of motor 187 have no effect upon the drive and motor 192 takes control substantially instantaneously to drive shaft 29 at reduced feeding speed. Likewise, when motor 187 is energized to rotate in a reverse direction at the completion of a cutting stroke, the opening of the circuit to coil 190a disconnects motor 192 and thus its inertia is without effect upon the drive and traverse on the return stroke is rapidly effected by motor 187. One advantage of the use of two motors is that, since one is used exclusively for effecting rapid traverse of the tool, it may be relatively small as compared to the other motor used for effecting feeding of the tool. Consequently, the traverse motor draws less power from the line and, being lighter, requires less time to come to a stop.

In Figure 17, we have shown a modification using two motors, each connected to a corresponding side of a differential that may be similar to differential 78 of Figure 2. Inasmuch as the drive from shafts 45 and 55, Figure 2, to lead and tool relief screw shafts 29 and 91 is the same in Figure 17 as in Figure 2, the same numerals have been applied to the corresponding parts in Figure 17 and need not be again described. However, shaft 45 is directly connected to a motor 212. This shaft has a splined portion 45a on which slides a brake disc 213 having a correspondingly splined bore. A coil 214a of an electro-magnet 214 when energized, attracts disc 213 to move the same into contact with a fixed brake surface on the housing of electro-magnet 214 to thus fix shaft 45 against rotation. Likewise, shaft 55 has a splined portion 55a, engaged by brake disc 215. Disc 215 is positioned to be attracted into contact with the fixed brake surface of the casing of an electro-magnet 216, when its coil 216a is energized. Shaft 55 is connected directly to motor 217.

The control circuits are so arranged, that motor 212 and coil 216 are simultaneously energized, while motor 217 and coil 214a are simultaneously energized, as will be obvious from inspection of Figure 17. Each motor is provided with adjustable rheostats 218 and 219 whereby the feeding and traverse speeds may be varied. While the drive from shaft 45 is irreversible because of worms 58 and 65, brake 213 is effective to prevent over-running of motor 212 and to bring it to a stop very quickly upon de-energization thereof and energization of motor 217. On the other hand, the drive from shaft 55 is reversible and thus brake 215 performs the dual function of locking that side of differential 78 to which it is connected when motor 217 is at rest and motor 212 is operating, and also of overcoming the momentum of the rotating parts connected to shaft 55 and bringing them quickly to rest. The controlling switch 220 corresponds in purpose and function to switch 127, Figure 15 whereby motor 217 drives shafts 29 and 91 during traverse movements, while motor 212 is cut in at the desired point in the travel of slide 23 to effect feeding of the tool. No changes in the circuits of Figure 15 are therefore required for the use of this modification.

Figure 18 shows a further modification using two motors, each connected through irreversible drives to respective sides of a differential as disclosed in connection with Figure 17. At 196 we have shown a shaft having fixed thereon a gear 197, in mesh with a worm 198 on shaft 199. Shaft 199 has its end splined, as at 199a, to slidably receive the splined bore of a clutch disc or armature 200. Motor 201 has a core 202 attached to its shaft and positioned within the coil 203a and fixed housing 203.

A second shaft 204 is connected through gear 205, worm 206, shaft 207 and clutch 208, to motor 209. As these clutches are similar in construction and function to those previously described in connection with Figures 2 and 16, it is unnecessary to describe them in detail. It will be understood that shafts 196 and 204 are connected to drive respective sides of a differential such as 78, Figures 2 and 17. Thus, shaft 196 may correspond to shaft 55 of said figure and may function for the same purpose, while shaft 204 may correspond to shaft 45 of Figure 2 and may function for the same purpose. However, because of the irreversible drives through worms 198 and 206, the electromagnetic brakes used in the preferred form of the invention may be omitted, while the clutches assure that the momentum of the rotating parts of either motor 201 or 209 is without effect upon the tool as soon as the corresponding clutch has been de-energized.

It has been stated that shaft 204 may correspond to shaft 45, shown at Figure 2. It will be remembered that the drive from such shaft may include change gears 62 and 63. The drive from shaft 204 may be exactly as shown at Figure 2 and, in addition to change gears, the speed of motor 209 may be varied by an adjustable rheostat 210 having a speed range over the range of speeds effected by successive pairs of change gears. In this way stepless speed changes are effected from the lowest speed possible with the change gears, to the highest speed thereof. In some instances where only a relatively small range of speeds is desired it will be possible to dispense with change gears 62 and 63. Switch 211 corresponds in all respects to switch 127, Figure 15, and 193, Figure 16, and operates in the manner previously described in connection with Figure 15, to effect a change from rapid traverse to feeding speeds, just prior to engagement of the tool with the work. Because of the interposition of the clutches the corresponding shaft stops quickly and rapid and accurate change-over is effected. When one clutch is opened, the irreversible drive through the worm 198 or 206, makes certain that the corresponding side of the differential will be held against movement while the other side is operated.

Figure 19:
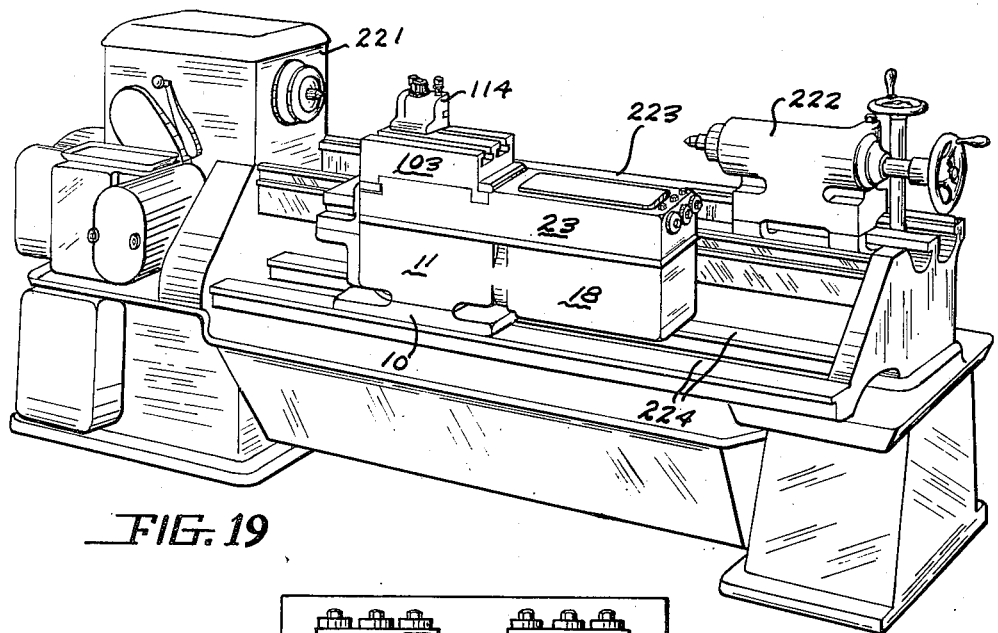
Figure 19 is a perspective view of our invention as applied to a lathe of conventional construction.

In Figure 19 we have shown our invention as applied to a lathe having a headstock 221 and tailstock 222, mounted on ways 223 in a conventional manner. The base 10 is mounted upon auxiliary ways 224 and is adapted to be fixed in adjusted position therealong so that slide 23 moves on bed 11 in a direction generally parallel to the axis of rotation determined by the spindles in the headstock and tailstock. The relation of the parts may be such that a tool in holder 114 moves substantially in the horizontal plane through the work axis of rotation, whereby various types of work not possible with a standard lathe may be effected.

Figure 20:
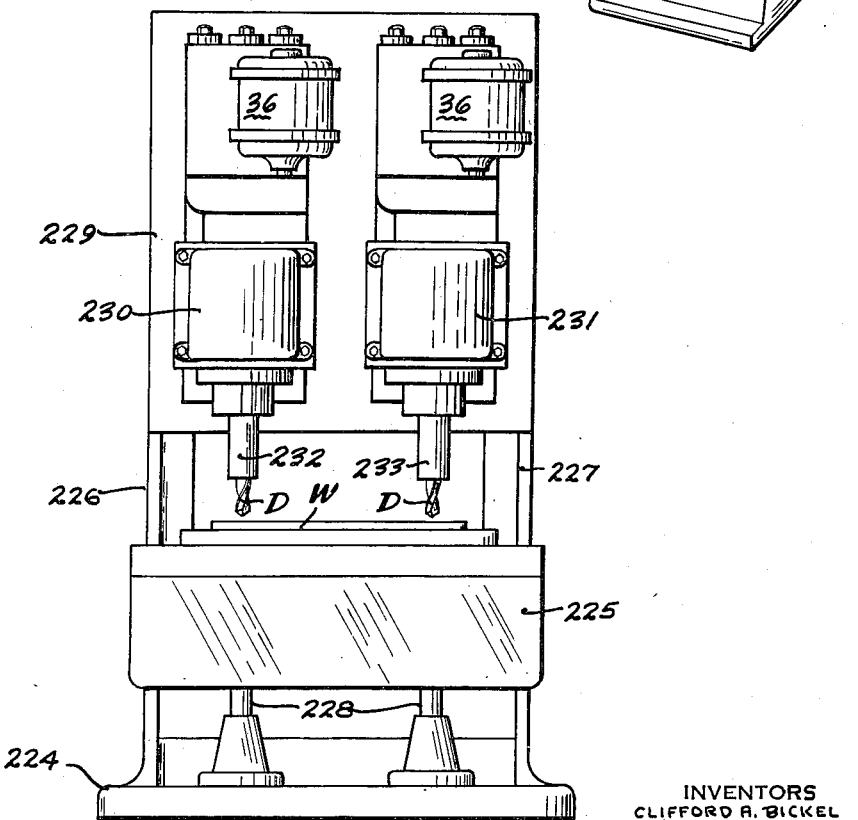
Figure 20 is an elevational view of a conventional boring machine using a pair of the attachments according to the invention without a relief slide.

In Figure 20 is illustrated a vertical boring machine having a base 224, a bed 225 vertically guided on ways 226 and 227, and adjustably supported at 228. A column 229 carries a pair of our attachments forming the subject matter of this invention, in which the relief slide 103 is omitted. Each attachment has a combined motor and gear box 230 or 231 fixed to its main slide 23. The gears in each box are connected to drive chucks 232 and 233 carrying tools such as drills D for operation upon a workpiece W. The operation of this set-up for effecting rapid and precise operations upon the work, as well as numerous other uses, will be obvious.

Figure 21 illustrates our invention applied to a lathe having a headstock 250 and a bed 252. The bed comprises the T-slots 254 which mount a slotted sub-bed 256 which carries the power unit 258. A second power unit 260 may be mounted on the bed 252 or on a second sub-bed. The sub-bed or beds permit the power unit to be shifted in and out for varying diameters of work. Thus, in combination with the power unit a slotted sub-bed such as is indicated at 256 provides for a device which may readily be set up for different types of work.

In Figure 22 there is shown a modified arrangement wherein a variable speed motor 262 drives through a shaft 264 into the change gears 266. A screw 268 is driven from the change gears and reciprocates a tool holder 270. The tool holder carries a cam 272 which is adapted for actuating the limit switches 274, 276 and 278 for controlling the motor 262. In operation, the tool holder 270 is moved forward at high speed until the cam 272 engages the limit switch 276. Thereafter, the tool moves forward at cutting speed until the cam strikes the limit switch 278. The unit then dwells for a clean-up period and thereafter rapidly retracts until the cam strikes the limit switch 274 which positions the tool at its original starting point. This control may be effected by controlling the motor through well known controls which are effective to vary its speed in either direction.

Should it be desired, for the purpose of greater accuracy, suddenly to start or to stop the screw 268 there may be provided the brake 280 and clutch 282 adapted for being engaged by the armature 284. In this case, the electrical control circuit including the aforementioned limit switches would be connected not only with the motor 262 but also with the actuating coils of the clutch and brake.

While we have shown the form of our invention now preferred by us, we wish it understood that the disclosure is illustrative only and not to be taken in a limiting sense. Numerous alterations, modifications and substitutions of equivalents will occur to those skilled in this art. Accordingly, we reserve all such alterations, modifications and substitutions as fall within the scope of the subjoined claims.

Having now fully disclosed our invention what we claim and desire to secure by Letters Patent is:

1. In a machine tool, a bed, a main slide guided on and by said bed for translation only in one direction, a cross slide guided on and by said main slide for movement relative to said main slide in a second direction normal to said first direction, said cross slide being adapted to carry a cutting tool, a power source fixed with respect to said bed, a first mechanical drive between said source and said cross slide, and a second mechanical drive between said first mechanical drive and said main slide and including a lost motion connection operable to move said main slide only after said cross slide has been moved a predetermined amount at one terminus of motion of said main slide.

2. In a machine tool, a support, a first slide guided on said support for translation in one direction, a second slide mounted on said first slide for movement in a second direction at an angle to said first direction, a cam means translatable on said first slide in said first direction, a cam follower on said second slide, resilient means urging said second slide to move said cam follower into contact with said cam means in said second direction, a power source, a drive connection between said source and said slides and including a lost motion connection whereby said cam means is first moved to permit said yielding means to move said second slide a predetermined distance before start of movement of said first slide.

3. In an attachment for machine tools, a first slide, a tool slide movable upon said first slide for tool relief, a cam, a cam follower on said tool slide, means interposed between said slides urging said follower into engagement with said cam, a first screw threadedly engaging said cam to actuate the same, a second screw threadedly engaging said first slide, a power drive to said first screw to actuate said cam and effect tool relief movement of said tool slide, and a lost motion drive between said screws whereby said second screw is rotated only after said first screw has rotated a predetermined amount on reversal of movement of said first slide.

4. In an attachment for machine tools, a support, a main slide guided on and by said support for translation in a first direction, a tool slide guided on and by said main slide for translation in a second direction normal to said first direction, a relief cam guided on and by said main slide for limited movement in said first direction, cam follower means on said tool slide, spring means urging said follower into contact with said cam means in a tool relief movement in said second direction, first and second screw shafts journaled in said support, said screws being parallel to said first direction, a first nut on said relief cam threadedly engaging said first shaft, a second nut on said main slide threadedly engaging said second shaft, and a lost motion connection between said first and said second shafts so constructed and arranged to effect movement of said cam means and hence said tool slide before movement of said main slide.

5. In an attachment for machine tools, a first slide guided for movement along a first path, a second slide guided on said first slide for movement in opposing directions along a second path at an angle to said first path, said second slide having detachable and interchangeable parts forming spaced parallel walls extending along said first path, one of said walls being formed with truncated teeth each tooth extending transversely of said direction, the other wall being planar, a cam mounted on said first slide for movement along said first path and having opposed edges in contact with the said walls with at least one of said edges formed with truncated teeth, and spring means urging said contacting toothed wall and edge into engagement, whereby said second slide is movable in one of said opposing directions upon movement of said cam along said first path.

6. In a machine tool, a base, a bed swiveled on said base, means for releasably locking said bed and base in angularly adjusted relation, a main slide on said bed, motor means carried by said bed, a first high speed drive from said motor means to said slide, a second slower speed drive from said motor means to said slide, switch means on said bed, means controlled by said switch means and operable to alternatively render said drives effective and ineffective, switch means on said bed operable to reverse said motor means and thereby said slide, and switch operating means on said slide, said switch operating means being adjustable on said slide to selectively vary the points in the operation of said slide at which said switches are operated.

7. A machine tool comprising a support, a slide guided on and by said support for rectilinear movement, motor means on said support, a variable speed drive between said motor means and slide for moving said slide, first and second switch means on said support and connected to reverse said motor means, third switch means on said support and connected to vary the speed of said drive, first, second and third screw shafts journaled in said slide, and a switch operating device threaded on each screw, each device corresponding to a respective one of said switch means, whereby said motor means and drive are automatically controlled by movement of said slide relative to said support.

8. A machine tool comprising a support, a slide guided for rectilinear movement in one direction on and by said support, motor means on said support, a variable speed drive operable to move said slide from said motor means, first and second switches on said support connected to reverse said motor means at opposite termini of said slide, a third switch on said support effective to change the speed of said drive, a plurality of screws journaled on said slide for rotation on axes parallel to said direction, and a switch actuating means on each screw and movable therealong on rotation of its respective screw, each switch actuating means having a portion moved in a path intersecting a respective one of said switches.

9. In an attachment for machine tools, a support, a slide guided for translation on said support in one direction, motor means on said support, a variable speed drive between said motor means and said slide, a first switch on said support connected to reverse said motor means at one terminus of said slide, a second switch on said support connected to reverse said motor means at the other terminus of said slide, first and second switch-actuating elements mounted on said slide and adjustable in said direction, and means for gauging the position of each said element with respect to said slide, each said element being movable in a path intersecting a respective switch whereby to automatically reverse said motor means at each said terminus.

10. In a machine tool, a bed, a slide on said bed, means forming a first compartment attached to said bed, said compartment having an upper wall, a motor in said compartment connected to drive said slide, means on said slide forming a second compartment superposed over said first compartment, a plurality of switches on said wall each having a plunger means projecting into said second compartment, a plurality of cams carried by said slide within said second compartment, each cam being movable on said slide in the direction of motion thereof and in a path intersecting its respective plunger, and means in said second compartment gauging the adjustment of each cam, said second compartment having a transparent top.

11. In a machine tool, a bed, a main slide guided for translation on and along said bed in a first direction, a tool slide guided for translation on and along said main slide in a second direction normal to said first direction, a motor on said bed, a differential having first and second power input means and power output means, a first drive between said motor and said first power input means of said differential, said first drive including a releasable first clutch, a second drive between said motor and said second power input means of said differential, said second drive including a releasable second clutch, and a third drive from the power output means of said differential to said slides, said third drive including a lost motion connection to said main slide.

12. In an attachment for machine tools, a bed, a slide guided on said bed for straight line motion in one direction, a power drive on said bed connected to move said slide in said direction at variable speeds, means forming a compartment attached to said slide, three screw shafts journaled in said compartment parallel to said direction, a nut on each shaft whereby on rotation of each shaft, its nut is adjusted relatively to the slide in said direction, first means for reversing said power drive at one terminus of said slide, second means for reversing said slide at the other terminus of said slide, third means for effecting a change in speed of said drive, and means carried by said nuts and movable in the path of said first, second and third means, to operate the same as said slide is moved.

13. In a machine tool attachment, a bed, a slide reciprocable on said bed, a pair of driving motors supported by said bed, a driving connection between each motor and said slide, each connection including a clutch, circuit connections for simultaneously energizing each motor and closing its clutch, and switch means automatically operated by said slide for alternatively energizing said motors and clutches.

14. An attachment for machine tools comprising a bed, a slide reciprocably mounted upon said bed, a pair of motor and clutch units, each connected to drive said slide, circuit means operable to simultaneously energize each motor and close its clutch, and means operable by and upon reciprocation of said slide to de-energize one unit and energize the other unit.

15. In an attachment for machine tools, a bed, a slide reciprocable upon said bed, a first motor carried by said bed, a first connection between said first motor and slide operable to reciprocate said slide at one speed and including an electro-magnetic clutch, a second motor carried by said bed, a second connection between said second motor and said slide operable to reciprocate said slide at a different speed, said second connection including an electro-magnetic clutch, circuit connections adapted to simultaneously energize each motor and close its clutch, and means operated by said slide to alternatively close said circuit connections.

16. An attachment for machine tools comprising a bed, a main slide reciprocably guided by said bed, a tool relief slide on said main slide, screw shafts connected to operate said slides, respectively, a pair of motor units carried by said bed, each motor unit comprising a motor and an electro-magnetic clutch therefor, drive means connecting each clutch to said shafts, circuit connections operable to simultaneously energize the motor and clutch of each unit, and means operated automatically by movement of said main slide to energize one unit and de-energize the other.

17. In an attachment for machine tools, a support, a slide guided on and by said support for reciprocation, a differential having first and second power input means and power output means, a driving connection from said power output means of said differential to said slide, a first motor, a relatively high speed drive from said first motor to said first power input means of said differential, first electrically-operated means to brake said first drive, a second motor, a relatively slow speed drive from said second motor to said second power input means of said differential, second electrically-operated means to brake said slow speed drive, a first circuit to simultaneously energize said first motor and said second electrically-operated means, a second circuit to simultaneously energize said second motor and said first electrically-operated means, and switch means controlled by reciprocation of said slide to simultaneously close one of said circuits and open the other.

18. In an attachment for machine tools, a support, a slide guided on and by said support for reciprocation, a differential having first and second power input means and power output means, a driving connection from said power output means of said differential to said slide, a first motor, a relatively high speed drive from said first motor to said first power input means of said differential, a first electro-magnetic brake connected with said high speed drive, a second motor, a relatively low speed drive from said second motor to said second power input means of said differential, a second electro-magnetic brake connected with said low speed drive, a first circuit to simultaneously energize said first motor and said second brake, a second circuit to simultaneously energize said second motor and said first brake, and means controlled by movement of said slide to energize one said circuit and de-energize the other said circuit.

19. In a power tool, a slide, a traverse motor connected to drive said slide at high speed, a feed motor connected to drive said slide at feeding speeds, first means responsive to energization of said traverse motor to brake said feed motor, second means responsive to energization of said feed motor to brake said traverse motor, and means operable at a predetermined point in the travel of said slide to energize one said motor and de-energize the other said motor.

20. In a drive for machine tools, a slide, a differential, having first and second power input means and power output means, a driving connection from said power output means of said differential to said slide, power means, a first high speed drive from said power means to said first power input means of said differential, a first electrically-controlled clutch in said first drive, a second low speed drive from said power means to said second power input means of said differential, a second electrically controlled clutch in said second drive, and means operated in response to movement of said slide to open one clutch and close the other.

21. In a machine tool attachment, a tool support, a screw for driving said tool support, a motor for driving said screw, means connecting said motor with said screw including a set of change gears and a clutch-brake device adapted selectively to brake said screw or to connect said screw with said motor, control means for controlling the speed and direction of rotation of said motor and for controlling the energization of said clutch-brake device including a plurality of limit switches adapted for actuation by said tool support in response to predetermined movements thereof brought about by said screw.

22. In an attachment for machine tools, a bed, a first slide guided on said bed for movement in one direction, a second slide guided on said first slide for movement relative thereto in another direction, motor means carried by said bed, first and second drives between said slides and said motor means, electrically controlled means for effecting alternate drives of said slides from said motor means through either of said drives, switch means and cam means carried on said bed and said first slide and adapted for energizing said electrically controlled means in response to predetermined movements of said slides, and lost motion means responsive to the initiation of movement of said first slide in either direction for first causing relative movement between said slides.

23. In an attachment for machine tools, a bed, a main slide guided on and by said bed for straight line movement in a first direction, a tool slide guided on and by said main slide for straight line movement in a second direction at an angle to said first direction, cam means on said main slide for controlling movement of said tool slide in said second direction, motor means carried by said bed, a differential having first and second power input means and power output means, selective variable speed drives between said motor means and said power input means of said differential, a connection from the power output means of said differential to said cam means, and a lost motion connection between said connection and said main slide whereby, upon reversal of said motor means, said cam means is actuated to effect relief motion of said tool slide prior to initiation of reverse movement of said main slide.

CLIFFORD A. BICKEL.
STANLEY A. BRANDENBURG.
THEODORE FOSTER.

REFERENCES CITED

The following references are of record in the file of this patent:

UNITED STATES PATENTS

| Number | Name | Date |
|---|---|---|
| 324,621 | Wheeler | Aug. 18, 1885 |
| 933,506 | Walpole | Sept. 7, 1909 |
| 1,130,054 | Barnum | Mar. 2, 1915 |
| 1,245,532 | Townsend et al. | Nov. 6, 1917 |
| 1,698,325 | Thomas et al. | Jan. 8, 1929 |
| 1,837,803 | Weston | Dec. 22, 1931 |
| 1,930,059 | Muller | Oct. 10, 1933 |
| 1,959,786 | Hodgkinson | May 22, 1934 |
| 1,964,188 | Karabetz | June 26, 1934 |
| 2,002,933 | Buell | May 28, 1935 |
| 2,069,508 | Rutemiller | Feb. 2, 1937 |
| 2,105,744 | Le Tourneau | Jan. 18, 1938 |
| 2,206,886 | Granberg | July 9, 1940 |
| 2,220,983 | Waters | Nov. 12, 1940 |
| 2,314,019 | Shaw | Mar. 16, 1943 |
| 2,352,183 | Bullard | June 27, 1944 |
| 2,352,185 | Bullard | June 27, 1944 |
| 2,368,408 | Brooking | Jan. 30, 1945 |
| 2,374,256 | Zimmerman | Apr. 24, 1945 |
| 2,375,422 | Leland | May 8, 1945 |